United States Patent
Nakao

(10) Patent No.: US 7,209,250 B2
(45) Date of Patent: Apr. 24, 2007

(54) DATA PROCESSING APPARATUS, PRINT-SETTING METHOD, AND RECORDING MEDIUM

(75) Inventor: Shuji Nakao, Kobe (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 735 days.

(21) Appl. No.: 09/945,745

(22) Filed: Sep. 5, 2001

(65) Prior Publication Data
US 2002/0035941 A1    Mar. 28, 2002

(30) Foreign Application Priority Data
Sep. 5, 2000   (JP) .............................. 2000-268832

(51) Int. Cl.
G06F 3/112      (2006.01)
G06F 15/00      (2006.01)

(52) U.S. Cl. .................................... 358/1.15; 358/1.13

(58) Field of Classification Search ............... 358/1.15, 358/1.16, 1.18, 1.9, 3.23, 1.13, 1.14, 1.1, 358/1.2, 1.11, 1.17; 709/220, 221, 225, 226, 709/229; 399/42, 81, 82, 83
See application file for complete search history.

(56) References Cited

U.S. PATENT DOCUMENTS 6,182,225 B1 *   1/2001   Hagiuda et al. ............ 713/201
6,233,414 B1 *   5/2001   Farrell ......................... 399/81
6,831,752 B1 *  12/2004   Matsuo ....................... 358/1.13
6,842,766 B2 *   1/2005   Brockway et al. .......... 709/203

FOREIGN PATENT DOCUMENTS

JP   2000-025311   1/2000
JP   2000-185450   7/2000

* cited by examiner

Primary Examiner—Dov Popovici
(74) Attorney, Agent, or Firm—Buchanan Ingersoll & Rooney PC

(57) ABSTRACT

In the data processing apparatus which performs a predetermined process over data to be printed on a printer according to the printer, and then transfers the data, groups of various printing setting values and registration names each identifying each group are mutually correlated and registered in setting-registration files for each user who uses the apparatus. When a printing request is received from one of the users, a setting window displays registration names indicating the groups of the setting values which are registered for each user and correspond to the user so that the user can select one of groups. One of the registration names displayed on the setting window is selected by the user. The apparatus performs the predetermined process for printing to the data to be printed in accordance with the various setting values included in the group corresponding to the selected registration name.

19 Claims, 13 Drawing Sheets

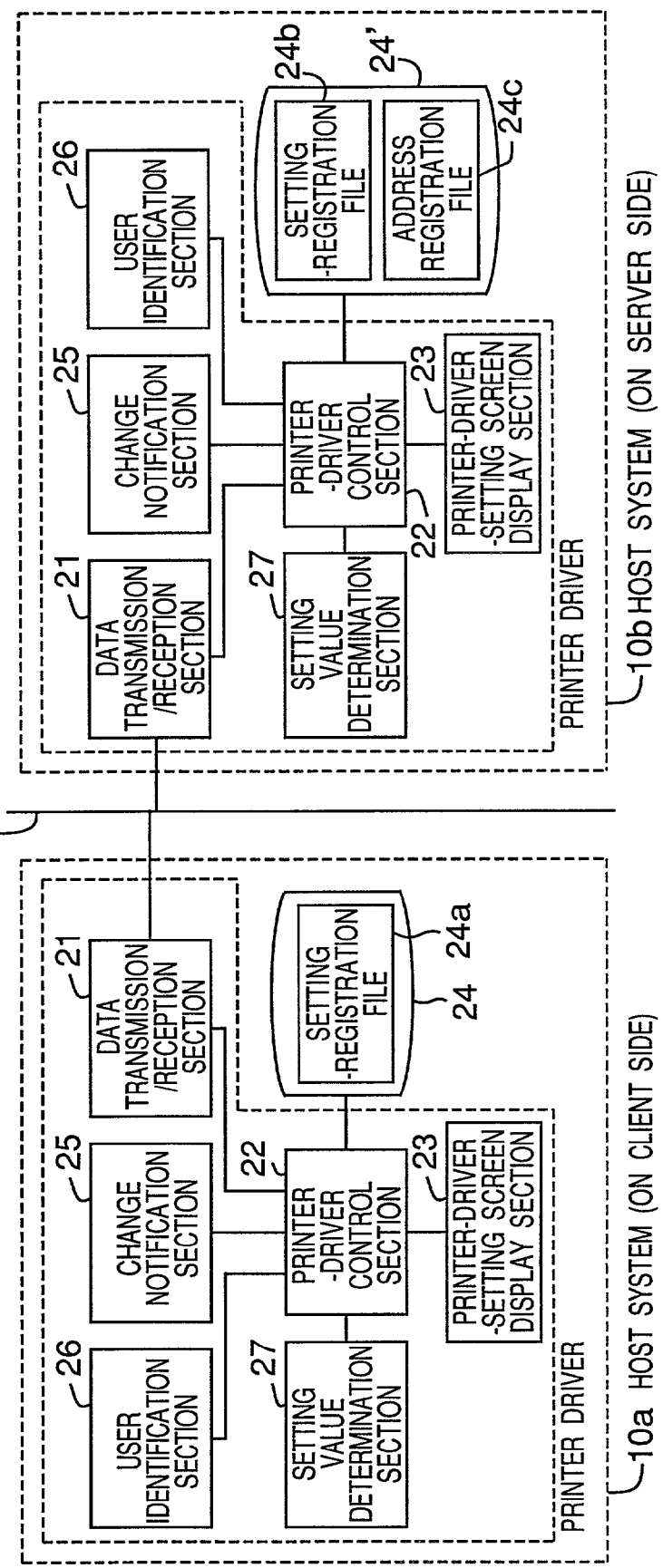

Fig. 3A

SETTING-REGISTRATION FILE FOR GENERAL USER ("User1. txt")

```
[SettingA1]
 Paper Source=Tray1
 Output=Mail Bin 1
 Pages per Sheet=4
[SettingA2]
 Paper Source=Tray2
 Output=Mail Bin 2
 Pages per Sheet=2
[SettingA3]
 Paper Source=Tray3
 Output=Mail Bin 3
 Pages per Sheet=1
```

Fig. 3B

SETTING-REGISTRATION FILE FOR GENERAL USER ("User2. txt")

```
[SettingB1]
 Paper Source=Tray5
 Output=Mail Bin 1
 Pages per Sheet=1
[SettingB2]
 Paper Source=Tray3
 Output=Mail Bin 2
 Pages per Sheet=4
```

Fig. 3C

SETTING-REGISTRATION FILE FOR ADMINISTRATIVE USER ("Admin. txt")

```
[Common Setting1]
 Paper Source=Tray1
 Output=Mail Bin 4
 Pages per Sheet=2
[Common Setting2]
 Paper Source=Tray1
 Output=Mail Bin 5
 Pages per Sheet=4
```

Fig.4

ADDRESS REGISTRATION FILE
(FILE NAME : UserIP.txt)

User1=150.17.40.43
User2=150.17.40.47
User3=150.17.40.51

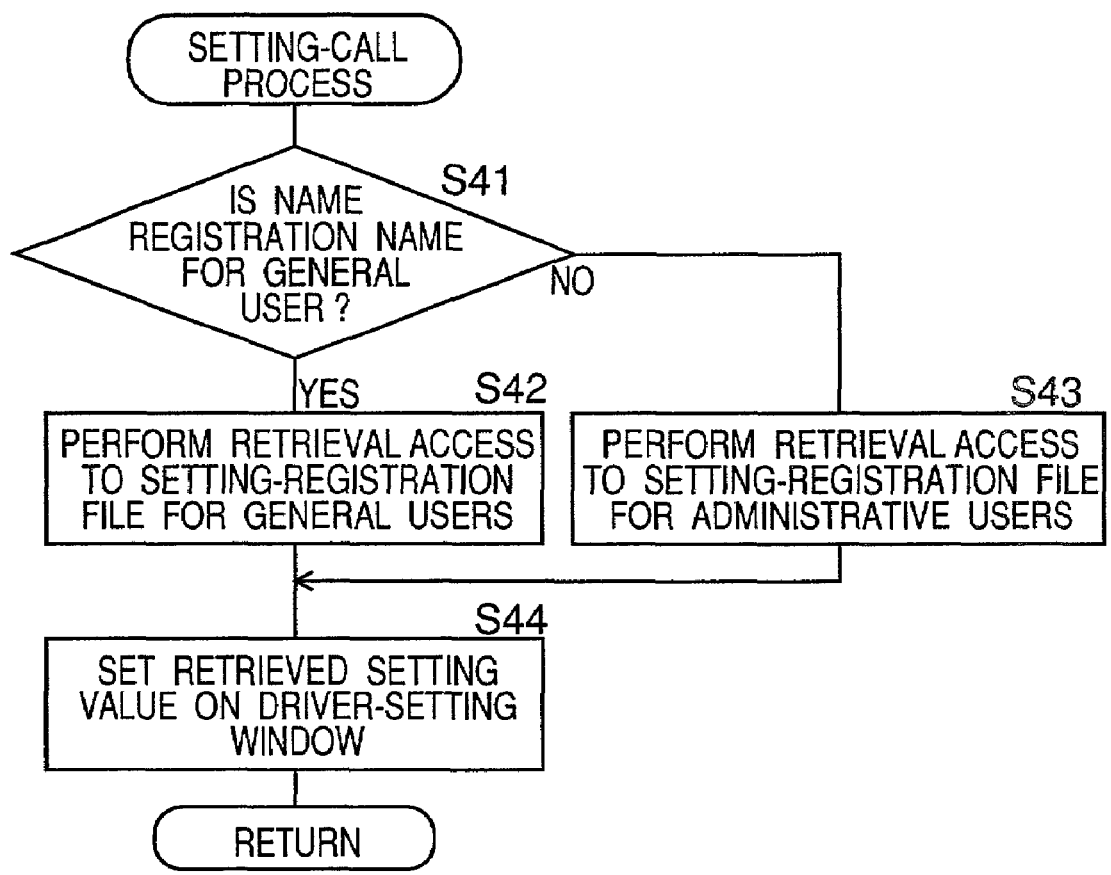

Fig.12

```
┌─────────────────────────────────────────────────┐
│ ADDITION OF REGISTRATION                        │
├─────────────────────────────────────────────────┤
│                                                 │
│  REGISTRATION NAME : [                    ]─51  │
│                        ┌─53                     │
│                        │ OK │  │ Cancel │       │
│                                                 │
└─────────────────────────────────────────────────┘
```

DATA PROCESSING APPARATUS, PRINT-SETTING METHOD, AND RECORDING MEDIUM

This application is based on application No. 2000-268832 filed in Japan.

BACKGROUND OF THE INVENTION

1. Field of the Invention

The present invention relates to a data processing apparatus capable of registering print-settings on a printer driver which is a software for controlling a printer.

2. Description of the Related Art

Generally, a printer driver is a software for controlling a printer, and converts documentation data created by using an application into data which can be controlled by the printer. The printer driver enables a user to perform various print-setting including a size of a print output, an output bin, the number of prints, and the number of pages in a print function in which data for multiple pages are reduced to allocate to one sheet of paper.

For example, in a conventional printer driver, a combination of setting values which are input through windows can be registered. The combinations are individually given registration names. The registration names and the combinations of setting values are mutually correlated and stored. To carry out print-settings by using the printer driver, the user simply selects only one desired registration name from a plurality of registration names displayed on a pulldown menu. This operation enables the user to specify a plurality of setting values at one time.

In an operating system (which hereinbelow will be referred to as an "OS"), such as Windows 95 (registered trademark) or Windows NT (registered trademark), users are classified into a class of administrative users (administrator) and a class of general users for management. The administrative users are provided with privileges or authorities for various administrative operations (for example, to change system settings and user settings). The setting registration for the above-described conventional printer driver can be carried out only by administrative users. Specifically, when a plurality of general users exist in one server, a setting-registration function is enabled only for the administrative users and the general users are not permitted to use the above registration function.

Suppose that the system is built such that general users are also permitted to use the above-described setting-registration function in the OS performing user management by classifying users into an administrative user and a general user. In such a system, a registration name of print-settings that has been registered by one general user is displayed also for the other general users. Registration-name menus to be displayed would therefore be very complicated. It would be a problem to overcome such a defect.

SUMMARY OF THE INVENTION

The present invention is made to solve these problems. An object of the present invention is therefore to provide a printing system in which even with an OS that classifies users into an administrative user and a general user, registration-name menus are not complicated.

In a first aspect of the invention, a data processing apparatus is provided. The apparatus performs a predetermined process corresponding to a printer for data to be printed in response to a print request from a user and then sends the data to the printer. The apparatus comprises the following sections. A registration section registers groups of various setting values relative to printing, for each user who uses the data processing apparatus. A display section for displaying the groups of setting values when receiving the print request from the user to enable one of the groups to be selected, the groups corresponding to the user. A process section performs the predetermined process to the data to be printed in accordance with the various setting values included in the one group of the setting values selected on the display section.

In the data processing apparatus, the registration section may register group names each identifying each group which are related to the respective groups. Then the display section may display the names identifying the groups to enable one of the names to be selected.

The data processing apparatus may further comprises a management section for managing users by classifying users into an administrative user having authority capable of performing predetermined management, and a general user without such a authority.

In the data processing apparatus, when the general user uses the data processing apparatus, the display section may display groups of various setting values for general users, and also may display groups of various setting values for administrative users to enable the groups of various setting values for administrative users to be selected.

In the data processing apparatus, when the administrative user uses the data processing apparatus, the display section may display groups of various setting values for administrative users, and also may display groups of various setting values for general users to enable the groups of various setting values for general users to be selected.

The data processing apparatus may further comprise a notifying section for notifying general users that the setting values for the administrative user is changed.

The data processing apparatus may further comprise a update section for updating a display of groups of setting values displayed to be capable of being selected, upon receiving a notification that the setting values for the administrative user is changed.

The data processing apparatus may further comprise a connecting section for connecting one data processing apparatus to the other data processing apparatus via a network.

In the data processing apparatus, the registration section may comprise a registry which is a data base to store setting information including various settings for hardware and software and settings for environment to each user in an operating system.

In a second aspect of the invention, a method is provided to perform print-setting on a data processing apparatus which performs a predetermined process corresponding to a printer to data to be printed in response to a print request from a user and then sends the data to the printer. The method comprises registering at least one of groups of various setting values relative to printing, for each user who uses the data processing apparatus; displaying the groups of setting values when receiving the print request from the user to enable one of the groups to be selected, the groups corresponding to the user; and performing a predetermined process to the data to be printed in accordance with the various setting values included in the one group selected from the displayed groups of the setting values.

The method may further comprising determining whether an operating user is an administrative user or a general user.

In a third aspect of the invention, a recording medium is provided. The recording medium stores a program to control print-setting for a data processing apparatus which performs a predetermined process corresponding to a printer for data to be printed in response to a print request from a user and then sends the data to the printer, wherein the program makes the data processing apparatus execute the following procedures. The procedures comprises: a procedure for registering at least one of groups of various setting values relative to printing, for each user who uses the data processing apparatus, a procedure for displaying the groups of setting values when receiving the print request from the user to enable one of the groups to be selected, the groups corresponding to the user; and a procedure for applying a predetermined process to the data to be printed in accordance with the various setting values included in the one group selected from the displayed groups of the setting values.

BRIEF DESCRIPTION OF THE DRAWINGS

FIG. 1 shows a configuration of a data processing apparatus according to the present invention;

FIGS. 3A and 3B each shows examples of setting registration file for a general user;

FIG. 3C shows a example of a setting-registration file for an administrative user;

FIG. 4 shows a example of an address registration file;

FIG. 10 is a flowchart of setting-call process;

FIG. 12 is an example of a registration-adding window;

PREFERRED EMBODIMENTS OF THE INVENTION

Hereinbelow, with reference to the accompanying drawings, a description will be made regarding a data processing apparatus of an embodiment according to the present invention.

The data processing apparatus of the present embodiment separates and stores a registration file in which settings for a printer driver are registered for each user. When the printer driver is operated by a user, the data processing apparatus displays only contents of setting-registration relevant to the operating user, but does not display contents of the setting-registration relevant to the other users. In addition, during an operation on OS which performs user management by classifying users into an administrative user and a general user, when an operating user is a general user, the data processing apparatus can optionally display setting-registration provided for the administrative user in addition to the setting-registration provided for the general user. Thus, to one general user setting-registration relevant to the other general users are not displayed. Consequently, displays in the printer driver would not be complicated.

Figure 2A:
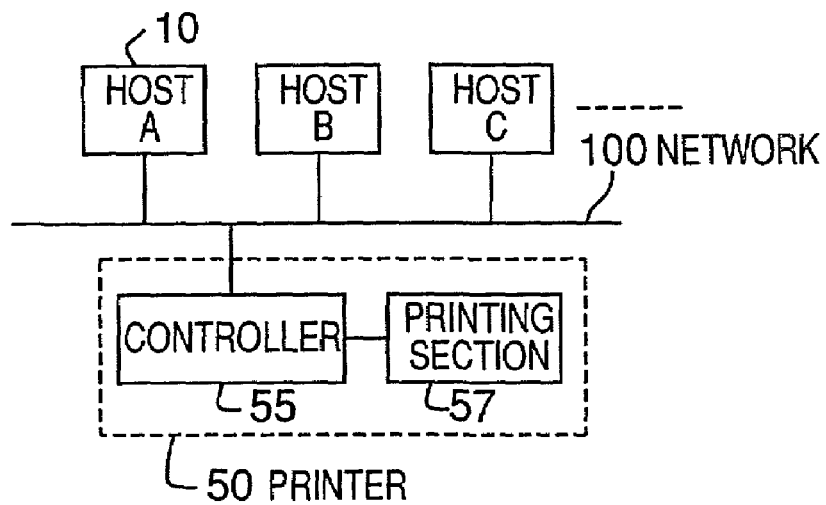
FIG. 2A shows a configuration of the data processing apparatus of the present invention on a network.

FIG. 1 shows a system including a data processing apparatus according to the present invention. The data processing apparatus is either a host computer 10a on client side (client-side host computer) or a host computer 10b on server side (server-side host computer). Hereinbelow, for the convenience of description, host computers 10a and 10b on the client side and server side may generically be referred to as a host computer 10. Ordinarily, as shown in FIG. 2A, a plurality of the host computers 10 are connected together via a network 100 and composes a printing system. A printer 50 is connected to the network 100 to be shared by the host computers 10. The printer 50 includes a control unit 55 controlling the operation of the printer 50 and a printing section 57 printing on papers.

Figure 2B:
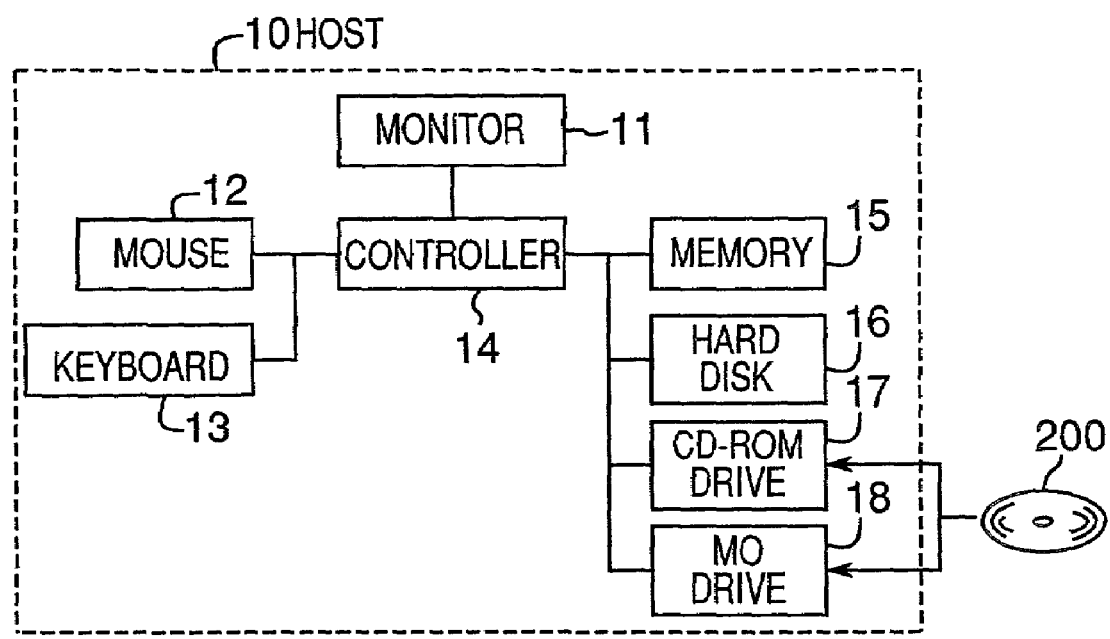
FIG. 2B shows a hardware configuration of the data processing apparatus (host computer)

The host computer 10 is formed of an information processor such as a personal computer, and has a hardware configuration shown in FIG. 2B. The host computer 10 includes a monitor 11, a mouse 12, a keyboard 13, a controller 14, a memory 15, a hard disk 16, a compact disk-read only memory drive 17 (CD-ROM drive), and a magneto-optic disk drive 18 (MO disk drive). The monitor 11 displays various items for user operations. The mouse 12 and the keyboard 13 are used to input data. The controller 14 is used to control the overall operation of the host computer 10. The memory 15 temporarily stores data including software programs executable in the controller 14. The hard disk 16 works as an auxiliary storage means for storing data including the software programs. The CD-ROM drive 17 writes data into or reads data from a CD-ROM. The MO disk drive 18 writes data into or reads data from an magneto-optic (MO) disk.

The operational control of the host computer 10 is implemented such that the controller 14 reads out a predetermined software program from the memory 15 and executes the program. The program can be provided via an information storage medium 200, such as a CD-ROM or a MO disk. The host computer 10 is installed with application programs (which hereinbelow may be referred to applications), such as word processors.

Turning to FIG. 1, each of the client-side host computer 10a and the server-side host computer 10b includes a print driver that creates printing-job data in accordance with the printer 50. The host computer 10 creates data for performing various printing-related control operations according to the control of the printer driver. Then the host computer 10 sends the data to the printer 50 via, for example, the network 100 for printing the data.

In FIG. 1, the printer driver is represented by function blocks implementing the printer driver. As shown in the drawing, the functions of the printer driver in the client-side host computer 10a are implemented by a data transmission/reception section 21, a printer-driver control section 22, a printer-driver-setting window display section 23, a change notification section 25, a user identification section 26, and a setting-value determination section 27. The data transmission/reception section 21 transmits or receives, for example, data to be printed, printing job data, data in a setting-registration file (described hereafter) and Internet-protocol addresses (IP addresses), via the network 100. The printer-driver control section 22 controls the overall operation of the printer driver. The printer-driver-setting window display section 23 controls the display of printer-driver setting windows. The change notification section 25 notifies that a change occurs in the setting registration, when the change occurs in the setting registration. The user identification section 26 identifies whether a user is a general user or an administrative user. The setting-value determination section 27 determines as to whether a setting-registration is a setting-registration for the general user or a setting-registration for the administrative users. The host computer 10*a* further includes a data storage section 24. The data storage section 24 is logically formed in information storage media, such as the memory 15, the hard disk 16, and the MO disk. The data storage section 24 stores a setting-registration file 24*a*. The setting-registration file 24*a* stores registration data in which combinations of various values set for the printer driver are correlated to names (registration names) of the combinations. The setting-registration file 24*a* is used for general users.

The server-side host computer 10*b* is configured similar to the client-side host computer 10*a*. However, a data storage section 24' of the server-side host computer 10*b* stores a setting-registration file 24*b* for administrative user, and in addition, an address registration file 24*c*. The address registration file 24*c* stores IP addresses of host computers through which a general user is using the printer-driver setting windows.

When a user requests printing data such as documentation data, from the data processing apparatus configured as described above, that is, the host computer 10, to the printer 50, the following procedure is carried out. That is, to print documentation data created by using an application installed in the data processing apparatus or data which is input through an interface, first, after the data is created or input, the printer driver is activated. Then, the functions of the printer driver are used to set a predetermined print-setting for setting for a type of paper and so on. Subsequently, a printing job is created which is converted to data in a form in accordance with the printer 50. Then, the printing job is sent to the printer 50. Upon receipt of the printing job, the printer 50 performs printing according to control information included therein.

Hereinbelow, a description will be made regarding the printer drivers installed in the host computers 10*a* and 10*b*. Generally, a printer driver is software for controlling a printer. The printer driver enables various setting functions for setting, for example, the type of paper, the number of sheets of the paper, and output bins. In the printer driver of the data processing apparatus according to the present invention, the aforementioned various settings are combined as a group for each user, and each combination with the associated name is registered in each of the setting-registration files 24*a* and 24*b*. In this case, the combinations of settings are registered to be identifiable for general users and administrative users, and those can be identified by the file names. Hereinbelow, for convenience, description will be made referring to three example settings as printer-driver settings, including the setting of a paper source tray, the setting of an output bin, and the setting of the number of pages in one sheet of the paper when a plurality of pages are reduced and printed on one sheet of the paper. However, the example settings do not limit printer-driver settings of the present invention.

FIGS. 3A to 3C each show a practical example of the setting-registration file 24*a* or 24*b*. FIG. 3A shows a setting-registration file provided for a general user of "User1", and that has the file name of "User1.txt". The name enclosed by "[ ]" is a registration name. The setting with a registration name of [SettingA1] sets "Tray1" as the paper source tray ("Paper Source"), "Mail Bin1" as the output bin ("Output"), and "4"as the number of pages ("Paper per Sheet") when a plurality of pages are reduced and printed on one sheet of the paper. FIG. 3B shows the setting-registration file provided for a general user of "User2", and that has the file name of "User2.txt". FIG. 3C shows a setting-registration file provided for an administrative user of "Admin" and that has the file name of "Admin.txt". In this case, a name of the setting-registration file and the setting-registration name specified in the setting-registration file are provided such that it can be determined as to whether the setting is provided for a administrative user or a general user.

FIG. 4 shows an example of the contents of the address registration file 24*c*. The file has the file name of "UserIP.txt", and stores the registration data of three IP addresses. The IP address is allocated to each host computer.

Figure 5:
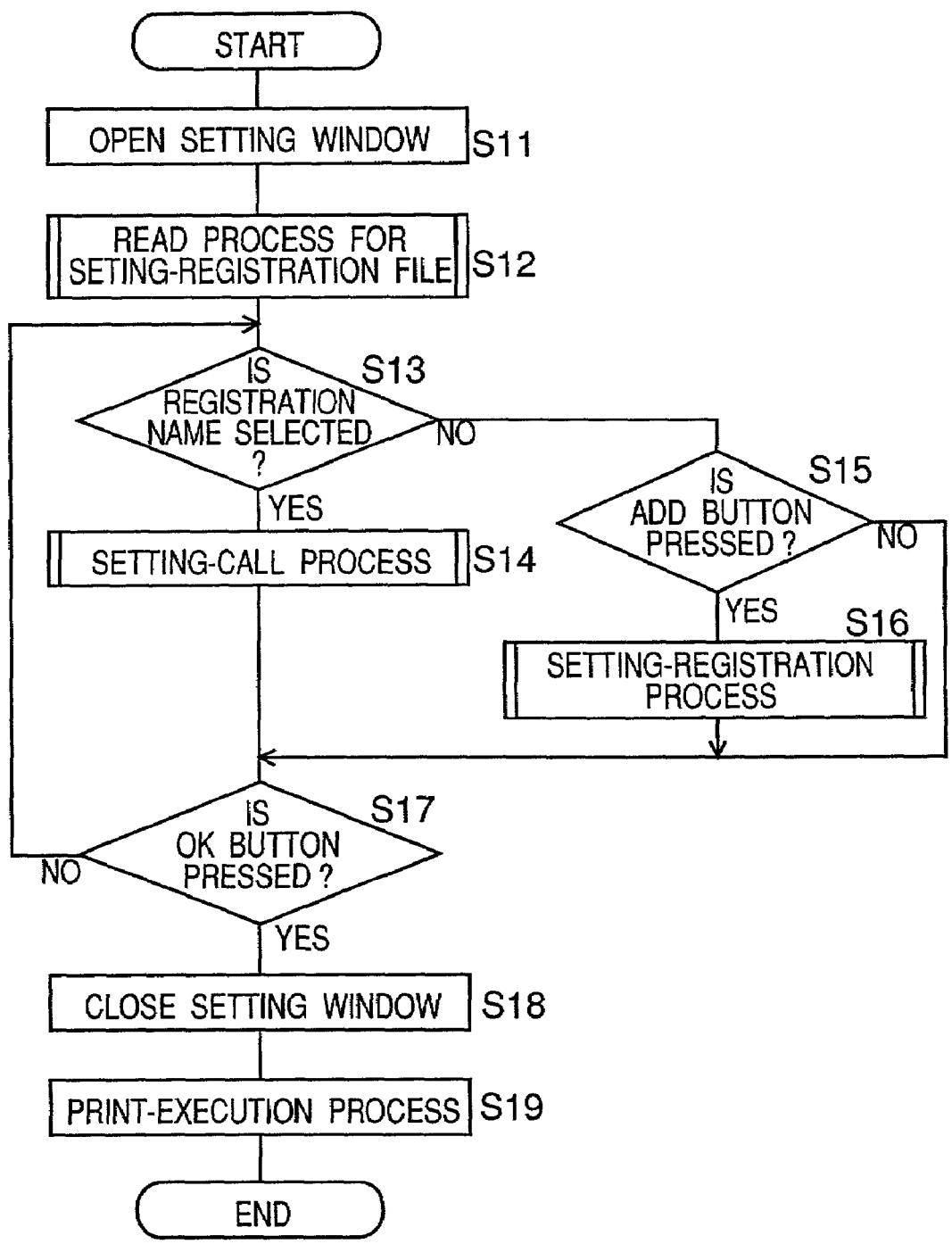
FIG. 5 is a flowchart of setting or registration processing for a setting value on a printer-driver setting window.

Referring to a flowchart in FIG. 5, operation of the data processing apparatus according to the present embodiment will be described. The operation described below is based on the individual functions of the printer driver shown in FIG. 1.

Figure 6:
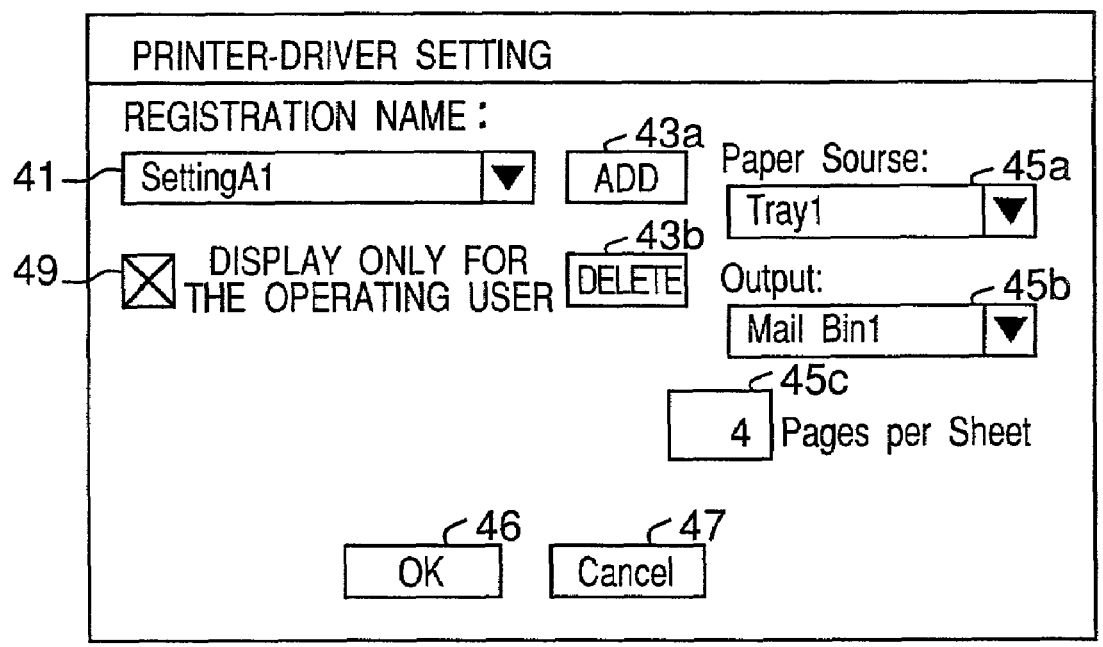
FIG. 6 shows an example of the printer-driver setting window.

First, when a user activates the printer driver to perform printing, a printer-driver setting window is opened (S11). Specifically, the printer-driver setting window as shown in FIG. 6 is displayed. The printer-driver setting window includes a registration name box 41, an add button 43*a*, a delete button 43*b*; setting-value input boxes 45*a*, 45*b*, and 45*c*, an OK button 46, a cancel button 47, and a check box 49. The registration name box 41 is used to specify a setting-registration name representing a combination of settings. The add button 43*a* is pressed to add a setting-registration item, and the delete button 43*b* is pressed to delete a setting-registration item. The setting-value input boxes 45*a*, 45*b* and 45*c* are used to set, for example, paper source, output bin, and the number of pages that are reduced and printed on one sheet of the paper in reduction printing. The OK button 46 is used to specify completion of a user operation. The cancel button 47 is used to cancel the operation. The printer-driver setting window includes a check box 49 which is used to optionally specify whether to display registration settings for users other than the registration-setting relative to the operating user. In the present embodiment, a setting specified with the check box 49 so as to display only setting-registration relative to the operating user is referred to a setting of "DISPLAY ONLY FOR THE OPERATING USER". The setting window is operated by using the mouse 12 and the keyboard 13.

Subsequently, read-out process is performed (S12). In the process, the contents of the setting-registration file 24*a* are read out to display the contents on the printer-driver setting window. The detail of this process will be described later. Then, it is determined whether or not the user selects a registration name to specify a combination of setting values which are registered in the setting-registration file 24*a* in advance (S13). If the user selects one registration name, setting-call process is performed (S14). The setting-call processing will hereafter be described in detail. If no setting-registration name is selected, a verification is made whether or not the add button 43*a* is pressed (S15). If the add button 43*a* is pressed, setting-registration process is performed (S16).

The above-described processes (steps S13 to S16) is iterated until the OK button 46 is pushed.

If the OK button 46 is pressed, the printer-driver setting window is closed (S18). Then, print-execution process is performed to create a printing job according to the printer-driver settings and to output the job data to the printer 50 for printing (Sl9).

Figure 7:
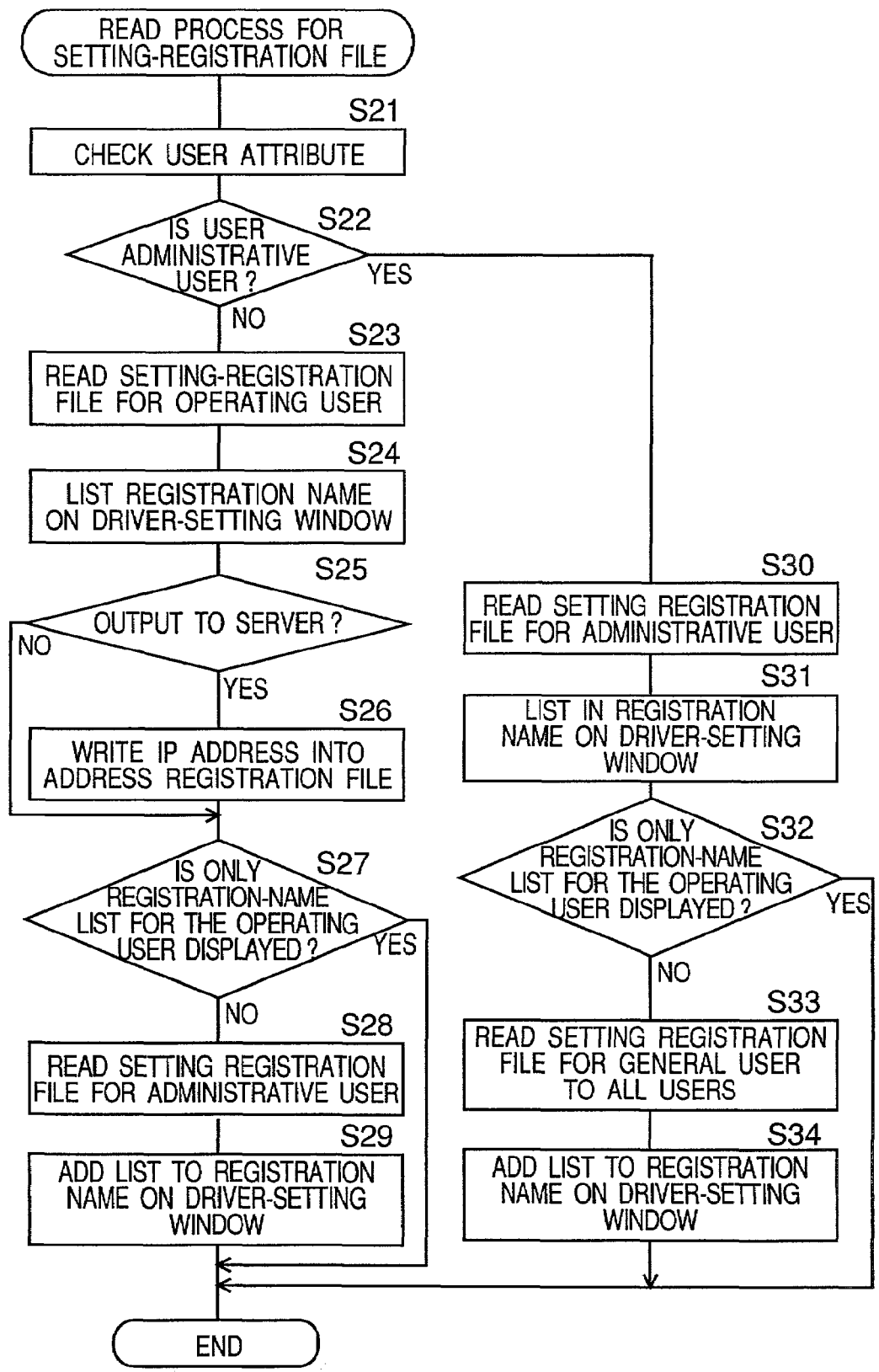
FIG. 7 is a flowchart of read-out process for a setting-registration files.

Hereinbelow, referring to a flowchart in FIG. 7, the aforementioned read-out process (step S12) for the setting-registration file will be described in detail.

The first operation checks the attribute of the user who operates the printer driver (S21). The attribute information regarding the user can be obtained by making inquiry access to the OS. According to the check result of the attribute information, a determination is made whether the operating user is an administrative user or not (S22).

Figure 8A:
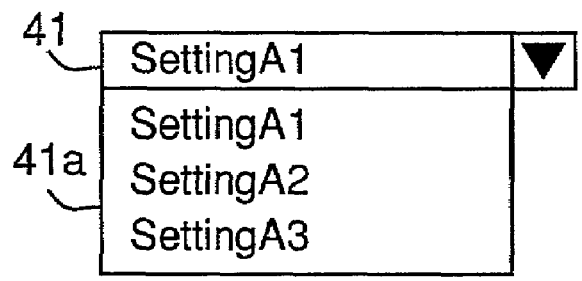
FIGS. 8A and 8B each shows an example display of a registration-name list of setting-registration items relative to a general user on the printer-driver setting window.

If the operating user is not an administrative user, that is, if the operating user is a general user, a setting-registration file 24*a* for general user relative to the operating user is read (S23). Registration names included in the read setting-registration file 24*a* are listed in a registration-name list that is to be displayed in the registration name box 41 of the printer-driver setting window (S24). For example, when the operating user is a general user of "User1", the setting-registration file 24*a* is as shown in FIG. 3A. From the setting-registration file 24*a*, the registration names each enclosed by "[ ]", namely, "SettingA1", "SettingA2" and "SettingA3" are read. Then, as shown in FIG. 8A, the registration names are listed in a pulldown menu 41*a* in the registration name box 41.

If the printing job to be processed is required to be output to the printer 50 connected to the network 100 (S25), an IP address of a host computer on which the printer-driver setting window used by the user is displayed is written in the address registration file 24*c* in the server 10*b* in the network 100 (S26).

Figure 8B:
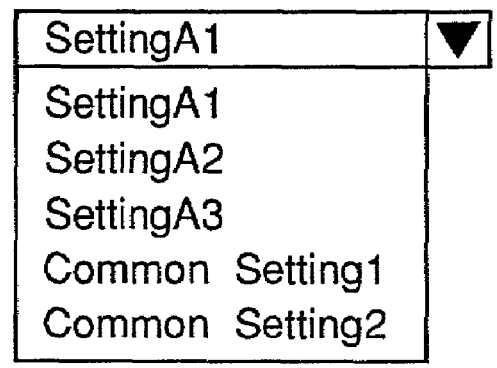

Next, verification is made for the setting in the check box 49 in the printer driver. Based on the verification, it is determined whether or not the setting is made to the setting for displaying a setting-registration only for the operating user. That is, it is determined whether or not the setting is made to the setting of "DISPLAY ONLY FOR THE OPERATING USER" (S27). If the setting in the check box 49 is the setting of "DISPLAY ONLY FOR THE OPERATING USER", the process terminates. On the other hand, if the setting in the check box 49 is not the setting of "DISPLAY ONLY FOR THE OPERATING USER", a setting-registration file 24*b* for administrative user is read out to display the setting-registration relative to administrative users in addition to the setting-registrations relative to the general users (S28). The list is added with the registration names of all the users registered in the setting-registration file 24*b* for administrative user (S29). FIG. 8B shows a state where setting-registration for the administrative users are further added and are listed in the pulldown menu 41*a* in the registration name box 41.

Figure 9A:
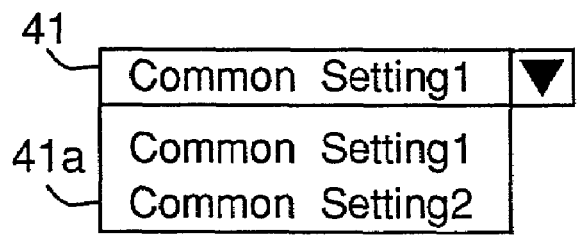
FIGS. 9A and 9B each shows an example display of a registration-name list of setting-registration items relative to an administrative user on the printer-driver setting window.

If the operating user is an administrative user, the setting-registration file 24*b* for administrative user is read (S30). Registration names included in the read setting-registration file 24*b* for administrative user are added to the registration-name list which is to be displayed in the registration name box 41 in the printerdriver setting window (S31). For example, when the operating user is the administrative user of "Admin", the setting-registration file 24*b* are as shown in FIG. 3C. From the setting-registration file 24*b*, the registration names each enclosed by "[ ]", namely, "Common Setting1" and "Common Setting2" are read and retrieved. Then, as shown in FIG. 9A, the registration names are listed in a pulldown menu 41*a* in the registration name box 41.

Figure 9B:
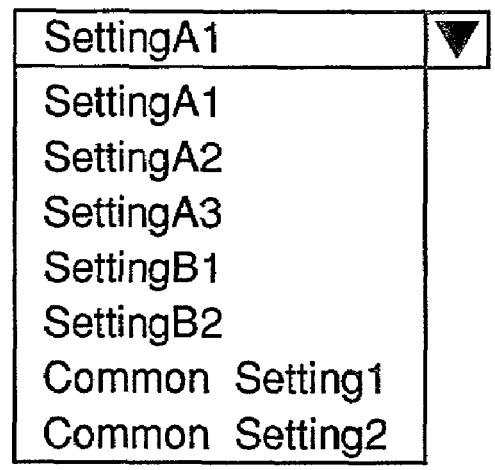

Then, a determination is made whether the setting is made to display the setting-registration relative to only the operating user. That is, a determination is made whether the setting is made to the setting of "DISPLAY ONLY FOR THE OPERATING USER" (S32). If the setting of the check box 49 is made to "DISPLAY ONLY FOR THE OPERATING USER", the process terminates. On the other hand, if the setting is made to "DISPLAY ONLY FOR THE OPERATING USER", the setting-registration file 24*a* for general user relative to all users are read to display the setting-registrations relative to all users in addition to the setting-registrations relative to the administrative users (S33). The list is added with the registration names of all the users registered in the setting-registration file 24*a* for general user (S34). FIG. 9B shows a state where setting-registration ("SettingA1", . . . "SettingB1", . . . ) of all the users are further added to the setting-registration for administrative users and are listed in the pulldown menu 41*a* in the registration name box 41.

Hereinbelow, referring to a flowchart in FIG. 10, the setting-call process (step S14) will be described.

First, a determination is made as to whether or not the registration name selected by the user is a registration name for a general user (S41). If the registration name is for a general user, the setting-registration file 24*a* for general user is accessed for retrieving (S42), while if the selected registration name is for an administrative user, the registration file 24*b* for administrative user is access for retrieving (S43). Then, setting values registered in the setting-registration files 24*a* and 24*b* accessed for retrieving, are set onto the printer-driver setting window (S44).

Figure 11:
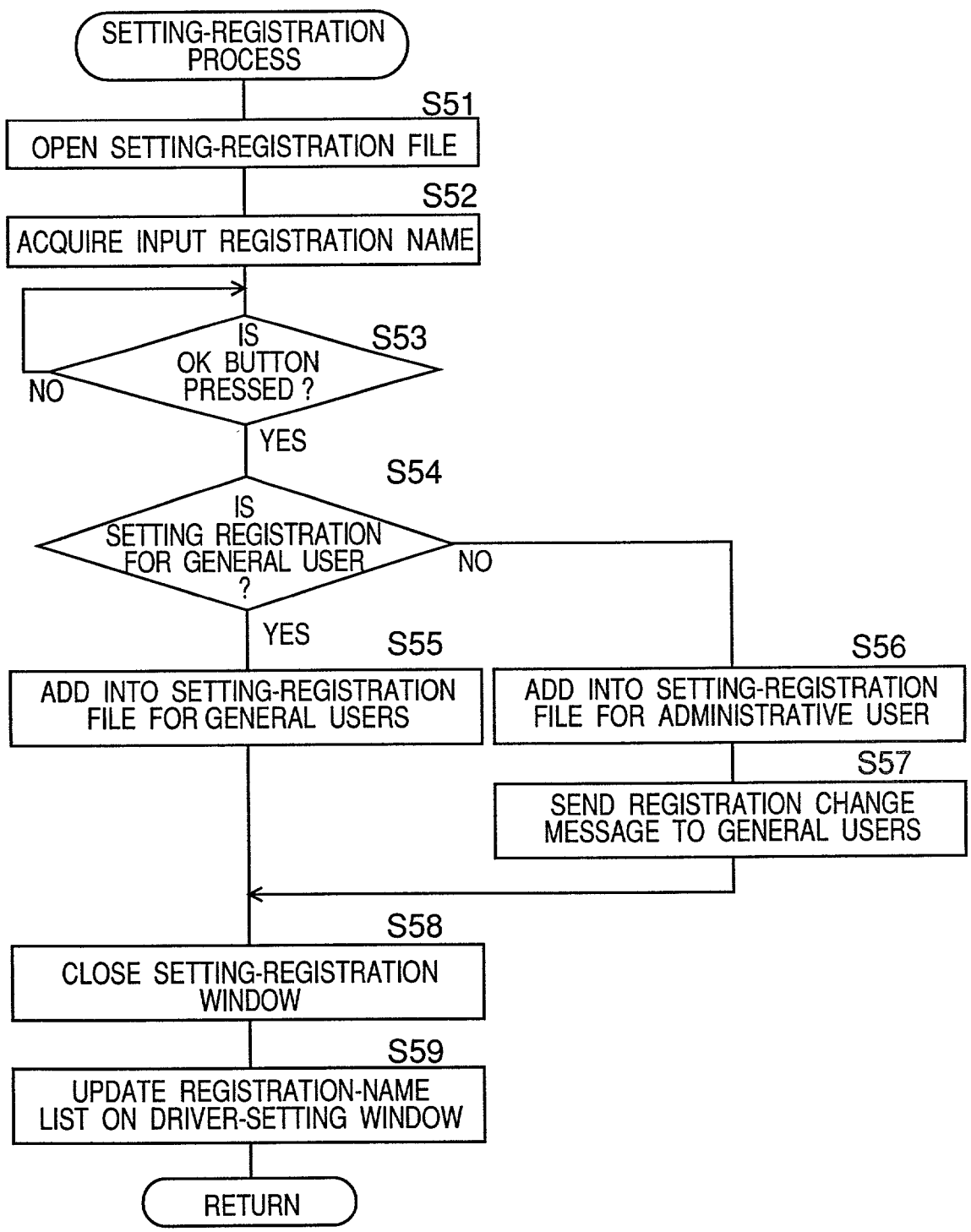
FIG. 11 is a flowchart of setting-registration process.

Hereinbelow, referring to a flowchart in FIG. 11, the setting-registration process (step S16) will be described.

In the process, first, a window as shown in FIG. 12 is opened (S51). The window is used to add setting-registration. The window includes an input box 51 and an OK button 53. The input box 51 is used to input setting-registration names to be added. The OK button 53 is pushed when the input operation is completed. A registration name input in the input box 51 on the window is then acquired (S52).

When the OK button 53 is pressed (S53), based on the acquired registration name it is determined whether the setting is made to the general users (S54). If the setting is made to the general users, the input registration name and individual setting values set at that time are added to the setting-registration file 24*a* for general user (S55). On the other hand, if the setting is not made for the general users (that is, if the setting is made for administrative users), the input registration name and individual setting values relevant thereto are added to the setting-registration file 24*b* for administrative user (S56). In addition, registration change messages are sent to all of the general users (S57). Specifically, the address registration file 24*c* being referred to, messages notifying that the change in registration are sent to the client-side host computers 10*a* registered in the address registration file 24*c*. Thereafter, the printer-driver setting window is closed (S58), to update the registration-name list in the printer-driver setting window, that is, the pulldown menu 41*a* (S59).

Next, a process of the general-user-side host computer (client-side host computer) when the general-userside host computer receives the registration change message from the administrative-user-side host computer (server-side host computer), will be described below. As described above, when the setting-registration file 24*b* for administrative user is changed, the registration change messages are sent to all of the general users. In this case, upon receipt of the message, the general-user-side host computer performs the following process.

Figure 13:
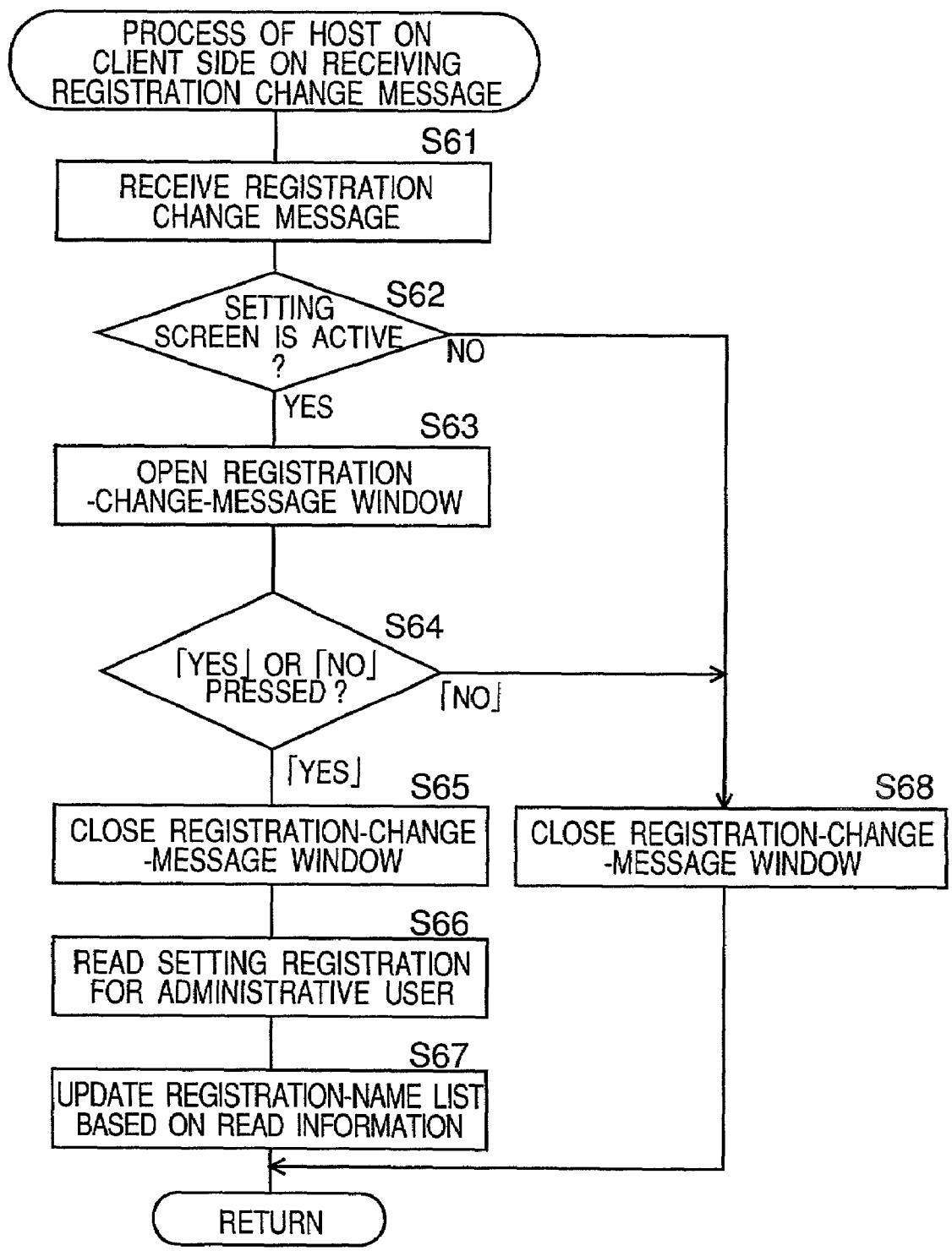
FIG. 13 is a flowchart of process to be performed by a host computer on general user side when a registration change message is received.
Figure 14:
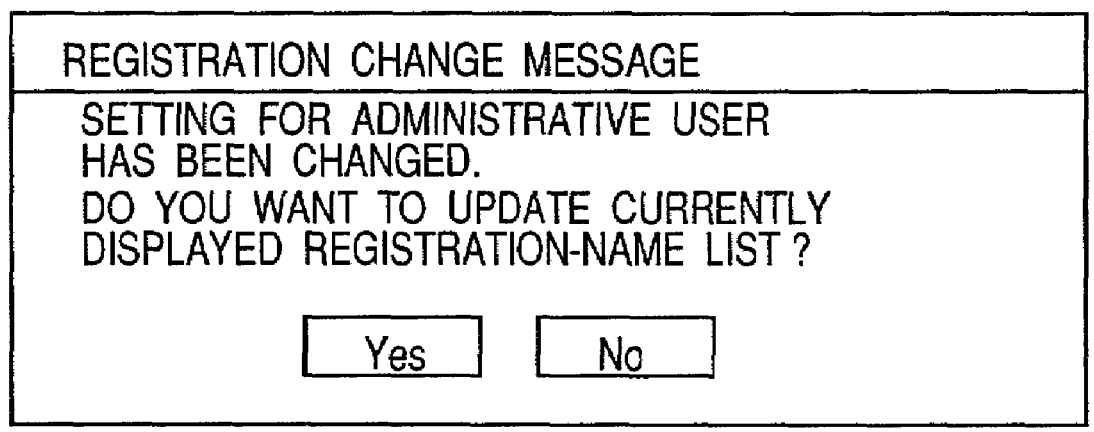
FIG. 14 shows an example of the displayed registration change message.

Referring to FIG. 13, when receiving the registration change message from the administrative-userside host computer (S61), the general-user-side host computer determines as to whether the printer-driver setting window is activated on the general-user-side host computer, that is, whether the setting window is displayed on the general-user-side host computer (S62). If the setting window is not activated, the process terminates. If the setting window is activated, the general-user-side host computer presents a message window to notify a registration change as shown in FIG. 14 (S63).

Subsequently, it is determined whether either one of "Yes" or "No" button is pressed on the message window (S64). If the "No" button is pressed, the registration change message window is closed (S68), and the process terminates. On the other hand, if the "Yes" button is pressed, the registration change message window is closed (S65), and the setting-registration file 24b for administrative user is read out (downloaded) from the server-side host computer 10b (S66). Based on the read or downloaded information, the data of the registration-name list on the printer-driver setting window is updated (S67).

As described above, when the administrative user changes contents of the setting registration file, the change message is displayed in the client-side host computer in which the printer driver is active. According to the above process, in a case where a setting for administrative users is changed while a general user uses the printer driver, the general user can always obtain the latest setting for administrative users.

In the present embodiment, the information of the combinations (groups) of the registration names and the individual setting values is registered in the setting-registration file 24a. However, in the OS such as Windows 95, Windows 98, or Windows NT, the information of the combinations may be registered in a registry which is a control file used for setting, for example, an environment of each user. In this case, the region of the registry is separated for each user, and data for each user may be written in the respective separated region.

As described above, in the data processing apparatus of the present embodiment, combinations of various setting values for the printer driver are stored with correlated registration names for each user. When an operating user performs setting for the printer driver, the system displays either only registration names of settings relative to the operating user, or the registration names of the settings relative to the operating user as well as registration names of settings relative to an administrative user. Thus, settings relative to general users other than the operating user are not displayed, and the display is not complicated.

<Advantages>

According to the data processing apparatus of the present invention, a setting-registration file including combinations of various setting values for printing is separated and stored for each user. In response to a printing request from a user, the data processing apparatus displays setting-registration items relative to the operating user, but concurrently does not display setting-registration items relative to users other than the operating user. In operation with an operating system (OS) that performs user management separately for the class of an administrative user and the class of a general user, when the operating user is belong to the class of a general user, the setting-registration relative to the operating user as well as the setting-registration relative to an administrative user can be displayed to be selected. This enables only registration names existing in a setting-registration file for the operating user to be displayed on a registration-name menu, not displaying setting-registration names of other general users on the same menu. Therefore, complicated window display can be prevented.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. A data processing apparatus which performs a predetermined process corresponding to a printer for data to be printed in response to a print request from a user and then sends the data to the printer, the apparatus comprising:
    a registration section for registering at least one group of various setting values for controlling the printer, the at least one group is identified with a specific user who uses the data processing apparatus;
    a display section for automatically displaying the at least one group of setting values in response to operation of the printer by the specific user to enable one of the at least one group to be selected; and
    a process section for performing the predetermined process to the data to be printed in accordance with the various setting values included in the one group of the setting values selected on the display section.

2. The data processing apparatus according to claim 1, wherein the registration section registers group names each identifying each group which are related to the respective groups, and wherein the display section displays the names identifying the groups to enable one of the names to be selected.

3. The data processing apparatus according to claim 1, further comprising a management section for managing users by classifying users into an administrative user having authority for predetermined management and a general user not having the authority.

4. The data processing apparatus according to claim 3, wherein, when the general user uses the data processing apparatus, the display section displays groups of various setting values for general users, and also displays groups of various setting values for administrative users to enable the groups of various setting values for administrative users to be selected.

5. The data processing apparatus according to claim 3, wherein, when the administrative user uses the data processing apparatus, the display section displays groups of various setting values for administrative users, and also displays groups of various setting values for general users to enable the groups of various setting values for general users to be selected.

6. The data processing apparatus according to claim 3, further comprising a notifying section for notifying general users that the setting values for the administrative user is changed.

7. The data processing apparatus according to claim 3, further comprising an update section for updating a display of groups of setting values displayed to be capable of being selected, upon receiving a notification that the setting values for the administrative user is changed.

8. The data processing apparatus according to claim 1, further comprising a connecting section for connecting one data processing apparatus to the other data processing apparatus via a network.

9. The data processing apparatus according to claim 1, wherein the registration section comprises a registry which is a data base to store setting information including various settings for hardware and software and settings for environment to each user in an operating system.

10. A method of performing print-setting on a data processing apparatus which performs a predetermined process corresponding to a printer to data to be printed in response to a print request from a user and then sends the data to the printer, the method comprising:
registering at least one group of various setting values for controlling the printer, the at least one group is identified with a specific user who uses the data processing apparatus;
automatically displaying the at least one group of setting values in response to operation of the printer by the specific user to enable one of the at least one group to be selected; and
performing a predetermined process to the data to be printed in accordance with the various setting values included in the one group selected from the displayed groups of the setting values.

11. The method according to claim 10, wherein the registering registers group names each identifying each group which are related to the respective groups, and wherein the procedure for displaying the names identifying the groups to enable one of the names to be selected.

12. The method according to claim 10, further comprising determining whether an operating user is an administrative user or a general user.

13. The method according to claim 12, wherein, when the operating user is a general user, groups of various setting values for general users are displayed, and also groups of various setting values for the administrative user are displayed to enable one of the groups of various setting values for the administrative user to be selected.

14. The method according to claim 12, wherein, when the operating user is an administrative user, groups of various setting values for the administrative user are displayed, and also groups of various setting values for the general user are displayed to enable one of the groups of various setting values for the general user to be selected.

15. A computer readable medium storing a computer program to control print-setting for a data processing apparatus which performs a predetermined process corresponding to a printer for data to be printed in response to a print request from a user and then sends the data to the printer, wherein the computer program makes the data processing apparatus execute the procedures comprising:
a procedure for registering at least one group of various setting values for controlling the printer, the at least one group is identified with a specific user who uses the data processing apparatus;
a procedure for automatically displaying the at least one group of setting values in response to operation of the printer by the specific user to enable one of the at least one group to be selected; and
a procedure for applying a predetermined process to the data to be printed in accordance with the various setting values included in the one group selected from the displayed groups of the setting values.

16. The computer readable medium according to claim 15, wherein the procedure for registering registers group names each identifying each group which are related to the respective groups, and wherein the procedure for displaying the names identifying the groups to enable one of the names to be selected.

17. The computer readable medium according to claim 15, further comprising a procedure for determining whether an operating user is an administrative user or a general user.

18. The computer readable medium according to claim 17, wherein, when the operating user is a general user, the procedure for displaying displays groups of various setting values for general users, and also displays groups of various setting values for the administrative user to enable one of the groups of various setting values for the administrative user to be selected.

19. The computer readable medium according to claim 17, wherein, when the operating user is an administrative user, the display section displays groups of various setting values for the administrative user, and also displays groups of various setting values for the general user to enable one of the groups of various setting values for the general user to be selected.

* * * * *